No. 728,674.  
PATENTED MAY 19, 1903.  
H. J. COOK.  
FISHING FLOAT.  
APPLICATION FILED DEC. 18, 1902.  
NO MODEL.

Witnesses  
E. H. Reichenbach  
L. Hilton

Inventor  
H. J. Cook.  
By H. B. Willson & Co.  
Attorneys

No. 728,674. Patented May 19, 1903.

UNITED STATES PATENT OFFICE.

HENRY J. COOK, OF OTTUMWA, IOWA.

FISHING-FLOAT.

SPECIFICATION forming part of Letters Patent No. 728,674, dated May 19, 1903.

Application filed December 18, 1902. Serial No. 135,747. (No model.)

*To all whom it may concern:*

Be it known that I, HENRY J. COOK, a citizen of the United States, residing at Ottumwa, in the county of Wapello and State of Iowa, have invented certain new and useful Improvements in Fishing-Floats; and I do declare the following to be a full, clear, and exact description of the invention, such as will enable others skilled in the art to which it appertains to make and use the same.

My invention is an improved fishing-float for fishing-lines; and it consists in the peculiar construction and arrangement of devices hereinafter fully described and claimed.

The object of my invention is to provide a novel fishing-float which is adapted to be readily attached to and detached from the line, which will retain its position on the line, and may yet be adjusted thereon toward and from the hook, as may be desired.

Figure 1:
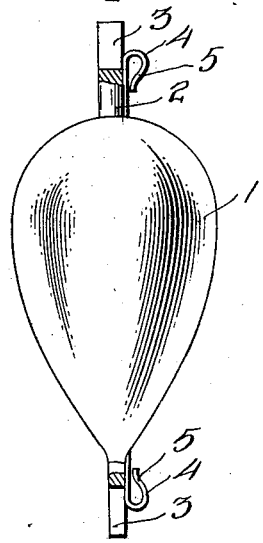
Figure 2:
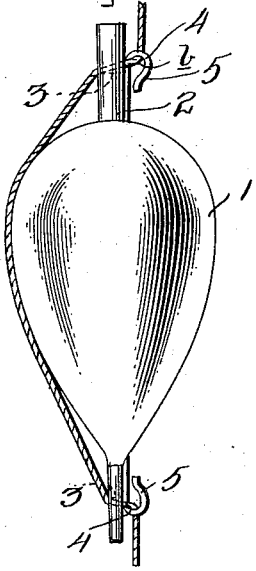
Figure 3:
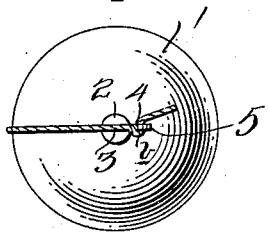

In the accompanying drawings, Figure 1 is a side elevation of a fishing-float embodying my improvements, the projecting ends of the stem being shown in section to disclose the open slots with which they are provided. Fig. 2 is a similar view showing the float attached to a line. Fig. 3 is a top plan view of the same.

The float 1 may be either of the form here shown or of any other suitable form, and the same is provided with a stem 2, the ends of which project beyond the ends of the float. Each projecting end of the stem is provided with a slot 3, disposed transversely thereof and open at its outer end. At the ends of the float and on one side of each of the projecting portions of the stem is a hook 4, adapted to engage the line, the latter being also engaged by the slots 3. These hooks at the opposite ends of the float are reversely disposed and have their arms 5 directed toward each other, and the said hooks which are disposed proximate to the slots 3 are disposed also radially with reference to the stem 2 at one side and directly in line with the said slots. The line being disposed in the slots 3 and engaged by the hooks 4 has bights *b* formed therein, which bights create sufficient friction between the line and the hooks to prevent the float from shifting its position on the line after it has been adjusted as may be desired with reference to the hook. Furthermore, it will be understood that the tension of the line will also cause the same to frictionally engage the inner ends of the slots 3 and one side of the float.

By disposing the reversely-directed hooks so that they extend outwardly from the stem and in line with the slots the float is adapted to be readily attached to and detached from the line in an exceedingly short time.

In practice the hooks are spring-hooks, and their arms 5 are normally closed to prevent the line from becoming disengaged.

In practice the float and the stem may be made of any suitable material. I do not limit myself in these particulars.

From the foregoing description, taken in connection with the accompanying drawings, the construction and operation of the invention will be readily understood without requiring a more extended explanation.

Various changes in the form, proportion, and the minor details of construction may be resorted to without departing from the principles or sacrificing any of the advantages of this invention.

Having thus fully described my invention, what I claim as new, and desire to secure by Letters Patent, is—

1. A fishing-float having a projecting stem provided with a transverse open slot, and a hook on one side of the stem extending outwardly from the slot, substantially as described.

2. A fishing-float having a stem projecting from the ends of the float, the projecting portions of the stem being provided with transverse open slots, and reversely-directed hooks on one side of the stem, and extending outwardly from the slots, substantially as described.

3. In combination a fishing-float having a stem projecting from the ends of the float, the projecting portions of the stem being provided with transverse open slots, and reversely-directed hooks on one side of the stem and extending outwardly from the slots, and a line on one side of the float, disposed in and extended through the slots of the stem and engaged by the hooks, the latter forming bights in the line, substantially as described.

In testimony whereof I have hereunto set my hand in presence of two subscribing witnesses.

HENRY J. COOK.

Witnesses:
  M. H. WILLIAMS,
  J. F. WEBBE.